(12) United States Patent
Kinose et al.

(10) Patent No.: US 6,572,834 B2
(45) Date of Patent: Jun. 3, 2003

(54) AQUEOUS ZINC NITRITE SOLUTION AND METHOD FOR PREPARING THE SAME

(75) Inventors: Yutaka Kinose, Tokyo (JP); Takahiro Nagayama, Tokyo (JP); Toru Hata, Tokyo (JP)

(73) Assignee: Nippon Chemical Industrial Co., Ltd., Tokyo (JP)

( * ) Notice: Subject to any disclaimer, the term of this patent is extended or adjusted under 35 U.S.C. 154(b) by 193 days.

(21) Appl. No.: 09/854,754

(22) Filed: May 15, 2001

(65) Prior Publication Data

US 2002/0001559 A1 Jan. 3, 2002

(30) Foreign Application Priority Data

May 15, 2000 (JP) .................................... 2000-141893

(51) Int. Cl.[7] .............................................. C01B 21/20
(52) U.S. Cl. ..................................................... 423/385
(58) Field of Search .......................................... 423/385

(56) References Cited

FOREIGN PATENT DOCUMENTS

JP          55054576      *   4/1980

* cited by examiner

*Primary Examiner*—Wayne A. Langel
(74) *Attorney, Agent, or Firm*—Birch, Stewart, Kolasch & Birch, LLP

(57) ABSTRACT

An aqueous zinc nitrite solution contains as impurities 10 ppm or less of sodium (Na) and 100 ppm or less of sulfate ions ($SO_4$) when the aqueous solution has a concentration of zinc nitrite [$Zn(NO_2)_2$] of 10% by weight in terms of $NO_2$. Also, disclosed is a method for preparing an aqueous zinc nitrite solution, including a first step of reacting zinc sulfate with calcium nitrite to form an aqueous zinc nitrite solution and a second step of purifying the aqueous zinc nitrite solution.

4 Claims, 1 Drawing Sheet

AQUEOUS ZINC NITRITE SOLUTION AND METHOD FOR PREPARING THE SAME

BACKGROUND OF THE INVENTION

The present invention relates to an aqueous zinc nitrite solution and to a method for preparing the same. More particularly, the present invention relates to an aqueous zinc nitrite solution containing only small amounts of sodium ions and sulfate ions as impurities and to a method for preparing the same. The present invention enables one to provide a very efficient surface treatment process by use of such an aqueous zinc nitrite solution.

Zinc nitrite is known to decompose at around 100° C. with release of nitrogen oxide when slowly heated in air. The zinc nitrite is known to be soluble in water and vulnerable to hydrolysis and forms zinc oxynitrite [$ZnO.Zn(NO_2)_2$] upon evaporation of its aqueous solution.

Generally, such zinc nitrite is prepared by a method of mixing zinc sulfate with an ethanol solution of sodium nitrite, filtering the resulting precipitate, and evaporating and concentrating the filtrate to obtain crystals (cf. Kagaku Daijiten).

However, this method, which is a method in which sodium sulfate is separated and removed by utilizing the difference in solubility between zinc nitrite and sodium sulfate, requires the use of ethanol, and the operations of evaporation and concentration. The method has problems in that it inevitably causes an increase in cost and in that sodium ions are allowed to remain.

Therefore, it is currently difficult to obtain high purity zinc nitrite or its aqueous solution on an industrial scale.

Further, as a pretreatment process prior to painting of a metal surface, a series of steps of degreasing, washing with water, film forming treatment, washing with water, and drying is generally carried out. As an example of the film forming treatment, a treating method for forming a film of zinc phosphate on the surface of steel is commonly adopted. As a film-forming agent used for this purpose, a treating liquid prepared by dissolving zinc in phosphoric acid and diluting the resulting solution with water has been used. This treatment is called "metal surface treatment".

Furthermore, in order to promote the film forming reaction of metal, a chemical such as sodium nitrite or sodium chlorate is added to the film-forming agent. These chemicals are called "promoters".

However, conventionally used sodium salts such as sodium nitrite and sodium chlorate have problems in that long usage of a treating bath increases the concentration of Na ions and as a result the pH of the treating bath is elevated so that components of the formed film precipitate in the treating bath. When recovering and regenerating the old treating liquid, accumulation of Na ions in the treating bath destroys the balance of the bath so that removal of Na ions from the recovered treating liquid is necessary. Usually, treating liquid containing Na ions has to be disposed of as industrial waste.

Recently, the issue of environmental protection has attracted much attention, even in the field of metal surface treating liquids and attempts have been made to establish a closed system for treating baths.

SUMMARY OF THE INVENTION

In view of the above, the present inventors have intensivly researched aqueous zinc nitrite solutions containing substantially no sodium ions and as a result they have found an aqueous zinc nitrite solution containing only a small amount of sodium ions or sulfate ions and a method for preparing the same.

They also have found that when the solution is used as a promoter for metal surface treatment, a very efficient surface treatment process can be provided. The present invention has been completed based on these findings.

That is, the present invention relates to an aqueous zinc nitrite solution characterized in that the solution contains as impurities 10 ppm or less of sodium (Na) and 100 ppm or less of sulfate ions ($SO_4^{2-}$) calculated when the aqueous solution has a concentration of zinc nitrite [$Zn(NO_2)_2$] set out 10% by weight in terms of $NO_2$.

The present invention also relates to a method for preparing an aqueous zinc nitrite solution, comprising a first step of reacting zinc sulfate with calcium nitrite to form an aqueous zinc nitrite solution and a second step of purifying the aqueous zinc nitrite solution.

In the present invention, barium ions may be preliminarily added in the first step of reacting zinc sulfate with calcium nitrite in an amount 1.05 times or more of the equivalent amount of sulfate ions dissolved in the reaction mixture after the reaction to form an aqueous zinc nitrite solution.

In the present invention, the reaction may be carried out at a Ca/Zn ratio in a starting material within the range of 0.5 to 1.5 in the first step of reacting zinc sulfate with calcium nitrite to form an aqueous zinc nitrite solution.

DETAILED DESCRIPTION OF THE INVENTION

Figure 1:
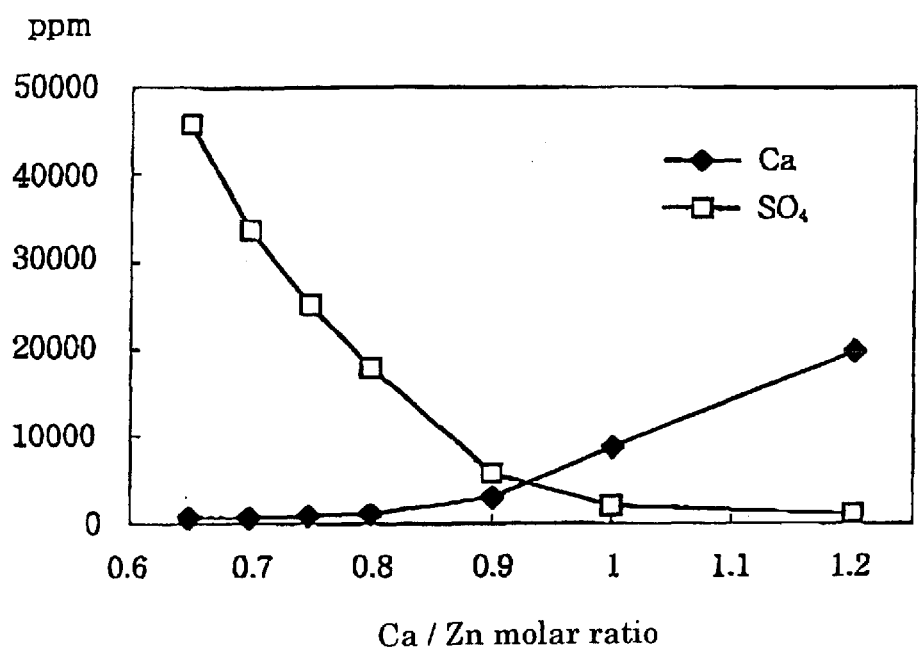
FIG. 1 is a diagram illustrating the behavior of impurity ions in reactions where the ratio of Ca/Zn is varied in the first step of Reference Example 1.

Hereinafter, the present invention will be described in detail.

The aqueous zinc nitrite solution of the present invention is a solution that comprises a component represented by the formula $Zn(NO_2)_2$ and $H_2O$ mixed at any optional ratio.

The aqueous zinc nitrite solution of the present invention, though difficult to be purified on an industrial scale, is characterized by low sodium ion ($Na^+$) and sulfate ion ($SO_4$) content.

Here, the concentration of zinc nitrite is determined by measuring zinc ions by ICP luminescence spectrometry and nitrite ions ($NO_2$) by ion chromatography.

Both sodium ions (Na) and sulfate ions ($SO_4$) as impurities are measured by ICP luminescence spectrometry. Sulfate ions are measured as sulfur (S) and is converted to a value of sulfate ions.

The concentration of impurities in the present invention is calculated as the amount present when the concentration of zinc nitrite is set as 10% by weight in terms of $NO_2$. The concentration of sodium (Na) is 10 ppm or less and preferably 5 ppm or less. The concentration of sulfate ions ($SO_4$) is 100 ppm or less and preferably 20 ppm or less.

The aqueous zinc nitrite solution of such a concentration contains, unlike the conventional ones, substantially no impurity ions such as sodium ions or sulfate ions and therefore this may be used as a promoter for metal surface treatment to obtain a very efficient surface treatment system.

The method for preparing an aqueous zinc nitrite solution of the present invention is characterized by a first step of reacting zinc sulfate with calcium nitrite to form an aqueous zinc nitrite solution and a second step of purifying the aqueous zinc nitrite solution.

The first step in the method of the present invention is performed according to the following reaction scheme.

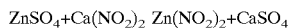

$$ZnSO_4 + Ca(NO_2)_2 \rightarrow Zn(NO_2)_2 + CaSO_4$$

The reaction temperature is 50° C. or less and more specifically from room temperature to 50° C. and preferably from room temperature to 40° C. The reaction time is not particularly limited and is from about 5 to 120 minutes.

It is preferable that the concentration of nitrite ion in the aqueous zinc nitrite solution be as high as possible. Though not particularly limited, the concentration of nitrite ions is from 5 to 15% by weight and preferably 10 to 15% by weight.

At this time, the difference in the Ca/Zn molar ratio upon mixing zinc sulfate and calcium nitrite which are starting materials result in a difference in the amount of remaining sulfate ions and calcium ions dissolved in the resulting aqueous zinc nitrite solution.]

The mixing molar ratio of Ca/Zn is preferably 0.5 to 1.5 and more preferably 0.7 to 1.0.

That is, if the Ca/Zn molar ratio is below 0.5, the sulfate ions dissolved in the aqueous zinc nitrite solution are 5% or more, which makes it difficult to subsequently remove the sulfate ions. On the contrary, it is not preferable for the Ca/Zn molar ratio to be greater than 1.5, since in this case the calcium ions dissolved in the aqueous zinc nitrite solution are 3% or more, similarly making subsequent removal of calcium ions difficult.

Calcium sulfate by-produced through the reaction is separated by filtration. The separation by filtration may be carried out immediately after completion of the reaction or the calcium sulfate may be separated during the filtration and separation of impurities in the purification performed in the subsequent second step. It is preferred to perform the filtration and separation simultaneously with the filtration and separation in the second step. The filtration and separation operations may be carried out by any method conventionally used on an industrial scale and are not particularly limited.

The second step of the method of the present invention is to remove and purify sulfate ions remaining in the solution.

Such a purification method may include, for example, the following:

(1) a method of adding barium ions to precipitate sulfate ions as barium sulfate;
(2) a method of passing the solution through a cation or anion exchange resin;
(3) a method of extracting the solution with a solvent; and the like. Of these, the method (1) is most preferred.

In the method (1) above, it is advisable to add a slightly excess amount of barium ions to the equivalent amount of sulfate ions dissolved in the reaction mixture after the reaction. The adding amount of barium ions is from 1.05 to 1.5 times, and preferably from 1.05 to 1.2 times of the equivalent amount of sulfate ions. In this case, it is not preferable to add too excessive an amount of barium ions.

The reaction may be carried out by preliminarily adding barium ions at the time of reaction in the first step as described above in an amount 1.05 times of the equivalent amount of sulfate ions that are expected to be dissolved in the reaction mixture after completion of the reaction.

The mode of addition of barium ion is not particularly limited but it is preferred to add them in the form of barium hydroxide.

Specifically, the aqueous zinc nitrite solution of the present invention is prepared, for example, by the following method. That is, an aqueous calcium nitrite solution is added to an aqueous zinc sulfate solution and the mixture is stirred so that a predetermined Ca/Zn ratio can be obtained. After completion of the reaction, a portion of the slurry is collected and measurement is made of sulfate ions in the slurry. Then, barium ions in the form of an aqueous barium hydroxide solution are added to the slurry in an amount at least equivalent to or more with respect to the sulfate ions and the mixture is stirred. After completion of the stirring, the reaction mixture is filtered to obtain the filtrate as a product. By washing the filtration cake with water, zinc nitrite attached thereto can be recovered in the form of a diluted aqueous solution. This solution can be used repeatedly in subsequent reactions.

The method of the present invention can provide an aqueous zinc nitrite solution containing minimum amounts of sodium ions and sulfate ions.

The aqueous zinc nitrite solution of the present invention can be used as a promoter for metal surface treatment.

Metals to which metal surface treatment using the promoter of the present invention can be applied include iron, zinc and alloys thereof as long as a film can be formed thereon.

Generally, the film formed includes zinc phosphate films iron phosphate films, manganese phosphate films and the like. When using the aqueous zinc nitrite solution of the present invention as a promoter, zinc phosphate films are particularly preferred.

When using the aqueous zinc nitrite solution of the present invention for zinc phosphate film, in the treating bath for forming the zinc phosphate film, the nitrite ions in the zinc nitrite have promoting effects similar to that of the nitrite ions in sodium nitrite. In addition, zinc ions are a major component of zinc phosphate film, so that the both anions and cations in zinc nitrite can exhibit their effect as surface treating agents.

However, the calcium ions in the aqueous zinc nitrite solution, when mixed with zinc phosphate based surface treating liquid, form calcium phosphate as sludge in the surface treating liquid. If the sludge is recovered periodically, at a proper interval, no accumulation of the sludge in the treating bath will occur. However, in the case where calcium ions are dissolved in the bath in large amounts, the amount of sludge formed in the bath increases accordingly. Thus it is preferred that the amount of calcium ions be as small as possible. It is preferred that the amount of dissolved calcium ions be 1% or less based on the total weight of the bath.

The sulfate ions when mixed with zinc phosphate based surface treating liquid gradually accumulate in the treating bath while the surface treating liquid is used for a long period of time although short use causes no problems. Accordingly, it is preferred that the surface treating liquid contains smaller amounts of impurities as in the case of the aqueous zinc nitrite solution of the present invent ions.

Therefore, the promoter for metal surface treatment comprising the aqueous zinc nitrite solution of the present invent ions is advantageous in making a treating bath in a closed system since it contains no unnecessary components such as sodium ions and even when the treating bath comprising it is used for a long period of time, it is only necessary to supplement nitrite ions with zinc nitrite so that no accumulation of unnecessary impurity components such as sodium ions will occur in the bath. Also, the present invent ions provides an excellent process from the viewpoint of environmental protection.

EXAMPLES

Hereinafter, specific examples of the present invention will be described in detail.

Example 1

This example presents an example under optimal conditions.
(First Step)
540 g of zinc sulfate heptahydrate (superlative grade reagent chemical) was dissolved in deionized water to prepare 1,000 g of an aqueous zinc sulfate solution. The concentration of zinc sulfate ($ZnSO_4$) in the solution was 30.0%.
660 g of a 30% aqueous calcium nitrite solution (trade name: CANI-30, produced by Nissan Chemical) was added to the aqueous zinc sulfate solution previously prepared to obtain a reaction mixture having a Ca/Zn molar ratio of 0.8. Then, the reaction mixture was stirred at ambient temperature (25° C.) for 1 hour.
(Second Step)
A portion of the slurry was collected and filtered and then calcium ions and sulfate ions in the filtrate were analyzed. As a result, the filtrate was found to contain 1,007 ppm of Ca ions, 17,723 ppm of $SO_4$ ions, and 3 ppm of Na ions. Then, barium ions in the form of an aqueous barium hydroxide solution were added to the slurry in an amount 1.2 times of the equivalent of $SO_4$ ions and the mixture was stirred for 1 hour. After completion of the stirring, the whole mixture was filtered to obtain an aqueous zinc nitrite solution. Table 1 shows the results of analysis of the aqueous zinc nitrite solution. In table 1, the right hand column shows the results after converting the $NO_2$ concentration from 10.51 wt % to 10.00 wt %.

TABLE 1

| Zn concentration | 8.58 wt % | Zn concentration | 8.17 wt % |
|---|---|---|---|
| $NO_2$ concentration | 10.51 wt % | $NO_2$ concentration | 10.00 wt % |
| Impurities | | Impurities | |
| Na ions | 3 ppm | Na ions | 2.9 ppm |
| Ca ions | 927 ppm | Ca ions | 883 ppm |
| $SO_4$ ions | 14 ppm | $SO_4$ ions | 13.3 ppm |

From the results of analysis shown in Table 1, it can be seen that an aqueous zinc nitrite solution containing substantially no Na ions and only a small amount of sulfate ions was obtained.

The aqueous zinc nitrite solution is useful as a promoter for metal surface treatment because of low Na ion and sulfate ion content and it is particularly preferable as a promoter for zinc phosphate films.

Reference Example 1

This reference example shows the behavior of impurity ions in reactions when the Ca/Zn ratio in the first step is varied.
(First Step)
In the same manner as in Example 1, 540 g of zinc sulfate heptahydrate (superlative grade reagent chemical) was dissolved in deionized water to prepare 1,000 g of an aqueous zinc sulfate solution. The concentration of zinc sulfate ($ZnSO_4$) in the solution was 30.0%.

536 g, 578 g, 619 g, 660 g, 743 g, 825 g, or 990 g of a 30% aqueous calcium nitrite solution (trade name: CANI-30, produced by Nissan Chemical) was added to the aqueous zinc sulfate solution previously prepared to obtain a reaction mixture having a Ca/Zn molar ratio of 0.65, 0.7, 0.75, 0.8, 0.9, 1, or 1.2.

Then, each of the reaction mixtures was stirred at ambient temperature (25° C.) for 1 hour. A portion of the slurry was collected and filtered and then calcium ions and sulfate ions in the filtrate were analyzed. Table 2 and FIG. 1 show the results.

TABLE 2

| | Ca/Zn | $Zn^{+2}$ (%) | $NO_2$ (%) | Na (ppm) | Ca (ppm) | $SO_4$ (ppm) | pH |
|---|---|---|---|---|---|---|---|
| Reference Example 1-1 | 0.65 | 11.3 | 8.54 | 2.4 | 613 | 45671 | 5.11 |
| Reference Example 1-2 | 0.7 | 11.0 | 9.2 | 2.6 | 713 | 33636 | 5.14 |
| Reference Example 1-3 | 0.75 | 10.8 | 9.95 | 2.8 | 898 | 25235 | 5.15 |
| Reference Example 1-4 | 0.8 | 10.6 | 10.51 | 3 | 1202 | 17968 | 5.16 |
| Reference Example 1-5 | 0.9 | 10.1 | 11.82 | 3.4 | 3064 | 5822 | 5.17 |
| Reference Example 1-6 | 1 | 9.2 | 13.13 | 3.8 | 8856 | 1908 | 5.24 |
| Reference Example 1-7 | 1.2 | 8.6 | 15.77 | 4.5 | 20001 | 1270 | 5.25 |

From the results of analysis, it can be seen that varying the molar ratio of starting materials, zinc sulfate and calcium nitrite in the react ions can control the residual amounts of calcium ions and sulfate ions in the obtained aqueous zinc nitrite solution.

Example 2

In the same manner as in Example 1, 540 g of zinc sulfate heptahydrate (superlative grade reagent chemical) was dissolved in deionized water to prepare 1,000 g of an aqueous zinc sulfate solution. The concentration of zinc sulfate ($ZnSO_4$) in the solution was 30.0%.

The aqueous zinc sulfate solution previously prepared was added to 640 g of a 30% aqueous calcium nitrite solution (trade name: CANI-30, produced by Nissan Chemical) to obtain a reaction mixture having a Ca/Zn molar ratio of 0.8.

Then, the reaction mixture was stirred at ambient temperature (25° C.) for 1 hour. A portion of the slurry was collected and filtered and then calcium ions and sulfate ions in the filtrate were analyzed. As a result, the filtrate was found to contain 1,007 ppm of Ca ions and 17,723 ppm of $SO_4$ ions.

Figure 2:
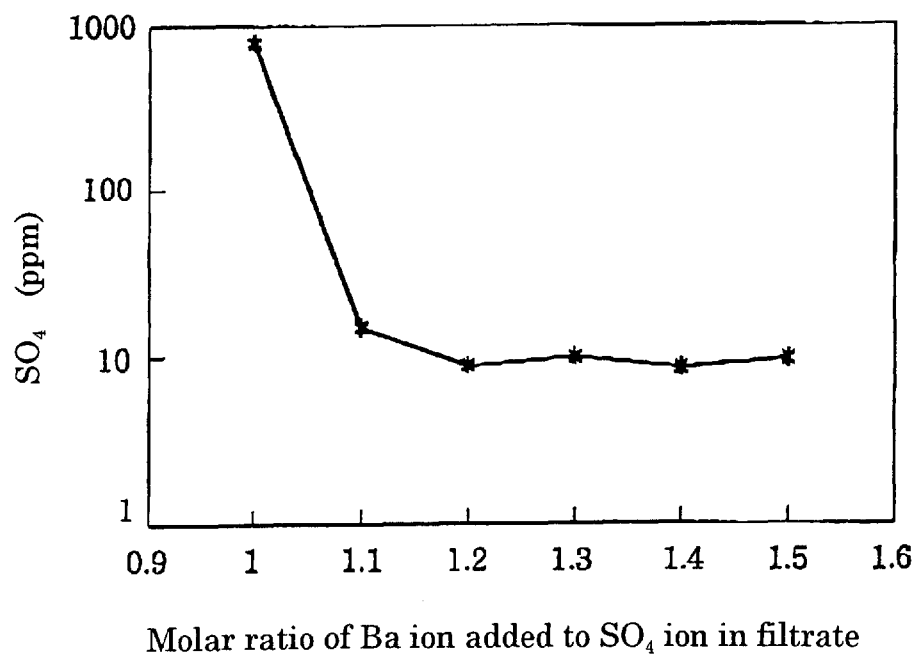
FIG. 2 is a diagram illustrating the influence of addition of barium hydroxide to remaining sulfate ions in the aqueous zinc nitrite solution of Example 2.

Then, barium ions in the form of an aqueous barium hydroxide solution were added to the slurry in a ratio of 1.1, 1.2, 1.3, 1.4, or 1.5 times the equivalent of $SO_4$ ions and each of the obtained mixtures was stirred for 2 hours. After completion of the stirring, the total amount was filtered to obtain an aqueous zinc nitrite solution for each react ions mixture. Table 3 and FIG. 2 show the results of analyses of the aqueous zinc nitrite solutions.

TABLE 3

| Reference Example | Ca/Zn | Amount of Ba ions | $Zn^{+2}$ (%) | $NO_2$ (%) | $SO_4$ (ppm) | Na (ppm) |
|---|---|---|---|---|---|---|
| Reference Example 2-1 | 0.8 | 1.0 time equivalent | 8.7 | 10.6 | 790 | 3 |
| Reference Example 2-2 | 0.8 | 1.1 times equivalent | 8.6 | 10.5 | 14.3 | 3 |
| Reference Example 2-3 | 0.8 | 1.2 times equivalent | 8.3 | 10.4 | 8.7 | 3 |
| Reference Example 2-4 | 0.8 | 1.3 times equivalent | 7.8 | 10.4 | 9.6 | 3 |
| Reference Example 2-5 | 0.8 | 1.4 times equivalent | 7.9 | 10.2 | 8.6 | 3 |
| Reference Example 2-6 | 0.8 | 1.5 times equivalent | 7.9 | 10.1 | 9.4 | 3 |

From the results of analysis, it can be seen that the addition of slightly more barium hydroxide as compared to equivalency with the sulfate ions remaining in the obtained aqueous zinc nitrite solution can decrease the sulfate ions in the aqueous zinc nitrite solution to about 10 ppm.

As described above, the aqueous zinc nitrite solution of the present invention is characterized by containing small amounts of sodium ions and sulfate ions as impurities. In the case where it is added to a surface treating agent based on zinc phosphate and a zinc phosphate film is formed on the surface of steel or zinc with it, it has excellent features in that accumulation of impurity ions in the treating bath is minimized so that not only the frequency of exchanging the liquid can be reduced greatly but also it is possible to establish a closed system using it.

What is claimed is:

1. An aqueous zinc nitrite solution characterized in that the solution contains as impurities 10 ppm or less of sodium (Na) and 100 ppm or less of sulfate ions ($SO_4^{2-}$) calculated when the aqueous solution has a concentration of zinc nitrite [$Zn(NO_2)_2$] set out 10% by weight in terms of $NO_2$.

2. A method for preparing an aqueous zinc nitrite solution, comprising a first step of reacting zinc sulfate with calcium nitrite to form an aqueous zinc nitrite solution and a second step of purifying the aqueous zinc nitrite solution.

3. The method for preparing an aqueous zinc nitrite solution as claimed in claim 2, wherein barium ions preliminarily added in the first step of reacting zinc sulfate with calcium nitrite to form an aqueous zinc nitrite solution in an amount 1.05 times or more of the equivalent of sulfate ions dissolved in the reaction mixture after the reaction.

4. The method for preparing an aqueous zinc nitrite solution as claimed in claim 2 or 3, wherein the reaction is carried out at a Ca/Zn ratio in a starting material within the range of 0.5 to 1.5 in the first step of reacting zinc sulfate with calcium nitrite to form an aqueous zinc nitrite solution.

* * * * *